United States Patent [19]
Ottenstein

[11] 3,851,521
[45] Dec. 3, 1974

[54] SYSTEM AND METHOD FOR LOCATING BREAKS IN LIQUID PIPELINES

[75] Inventor: Sidney Allan Ottenstein, Spring, Tex.

[73] Assignee: M & J Valve Company, Houston, Tex.

[22] Filed: Jan. 19, 1973

[21] Appl. No.: 325,046

[52] U.S. Cl............................................ 73/40.5 R
[51] Int. Cl........................... G01m 3/16, F17d 3/04
[58] Field of Search.............. 73/40.5 R, 40, 40.5 A, 73/196; 340/240, 242; 235/151.34

[56] References Cited
UNITED STATES PATENTS
| | | | |
|---|---|---|---|
| 3,105,883 | 10/1963 | Higson, Jr..................... | 73/40.5 R X |
| 3,505,513 | 4/1970 | Fowler et al.................. | 235/151.34 |
| 3,575,040 | 4/1971 | Bosselaar........................ | 73/40.5 A |

FOREIGN PATENTS OR APPLICATIONS
| | | | |
|---|---|---|---|
| 2,005,761 | 8/1971 | Germany......................... | 73/40.5 R |

*Primary Examiner*—Richard C. Queisser
*Assistant Examiner*—Joseph W. Roskos
*Attorney, Agent, or Firm*—Flehr, Hohbach, Test, Albritton & Herbert

[57] ABSTRACT

System and method for detecting and locating a spontaneous leak or break between spaced detecting stations in a pipeline carrying liquid, making use of negative pressure waves propagated through the liquid in the line at the speed of sound when a break occurs. Electrical signals proportional to the negative pressure in the pipeline are generated at the detecting stations and compared with reference signals corresponding to the normal pressure in the line. In the event of a break in the line, an electrical signal is generated in response to a negative pressure wave arriving at each detecting station, and the signals are transmitted to a common receiving station. The signals as received are displaced in time by an amount corresponding to the location of the break relative to the detecting stations, and the location of the break can be determined from the time interval between the transmitted signals, the distance between the detecting stations, and the velocity of sound in the liquid.

13 Claims, 4 Drawing Figures

SYSTEM AND METHOD FOR LOCATING BREAKS IN LIQUID PIPELINES

BACKGROUND OF THE INVENTION

This invention pertains generally to liquid pipelines and more particularly to systems and methods for detecting and locating a spontaneous leak or break in a pipeline carrying liquid, such as petroleum products. It has been found that a sudden leak or break in a pipeline carrying liquid under pressure is accompanied by a rapid drop in pressure which is propagated away from the leak or break as a negative pressure wave. Such negative pressure waves travel through the flowing liquid with a velocity corresponding to the velocity of sound in the liquid.

Heretofore, such negative pressure waves have been utilized for detecting and locating the position of pipeline breaks. However, the detecting means employed has been a pressure difference method comprising a movable fluid pressure operated member (e.g., a diaphragm) between closed fluid chambers. One chamber has a direct fluid connection with the pipeline, and the second chamber has a fluid connection with a reference or buffer tank. The tank in turn has a fluid connection within the pipeline through a check valve that is bypassed by a flow restricting orifice, whereby positive pressure are applied to the second fluid chamber and normal line pressure maintained in the tank. In the event of a sudden drop in the line pressure, a pressure differential is created between the line and the tank, and between the fluid chambers, and this differential is detected by the pressure meter. The location of the leak or break in the line is determined by comparing the readings of the meters at the different stations spaced along the line.

This prior technique will give satisfactory results under some conditions. However, it requires a reference tank, a differential pressure meter, a restrictive orifice and a check valve at every detecting station. The reference tank is bulky, and the system will not operate properly if the orifice or the fluid connections are wholly or partly obstructed by frozen or solidified liquid or other foreign matter. In addition, temperature variations between the pipeline and reference tank produce pressure differences and cause inaccuracies. Such systems are not adaptable to wide variations in line pressure, and being mechanical, they are subject to a certain amount of friction which produces additional inaccuracies.

SUMMARY AND OBJECTS OF THE INVENTION

The present invention provides an electronic system and method for detecting and locating a spontaneous leak or break in a pipeline from the negative pressure waves produced by the leak or break. At each detecting station, an electrical signal is generated corresponding to the pressure of the liquid in the pipeline at the station, and a reference signal corresponding to the normal pressure in the line is derived from the electrical signal. A leak or break in the line is detected by a change in the electrical signal relative to the reference signal at each station as the negative pressure wave reaches that station. Such signals are transmitted from two or more detecting stations to a receiving station where they are utilized to detect and locate the position of the break. The received transmitted signals are displaced in time by an amount corresponding to the location of the leak or break relative to the detecting stations, and thus the location of the leak or break can be determined at the receiving station from the time interval between the transmitted signals, the known distance between the detecting stations and the velocity of sound in the liquid. In one embodiment, the signals transmitted to the receiving station vary continuously with the difference between the reference signals and the electrical signals, while in a second embodiment, signals are transmitted only when the electrical signal differs from the reference signal by a predetermined amount.

It is in general an object of the invention to provide a new and improved system and method for detecting and locating a spontaneous leak or break in a liquid pipeline.

Another object of the invention is to provide a method and system of the above character in which the occurrence of a spontaneous leak or break is determined electronically.

Additional objects and features of the invention will be apparent from the following description in which the preferred embodiments are set forth in detail in conjunction with the accompanying drawings.

DESCRIPTION OF THE PREFERRED EMBODIMENTS

Figure 1:
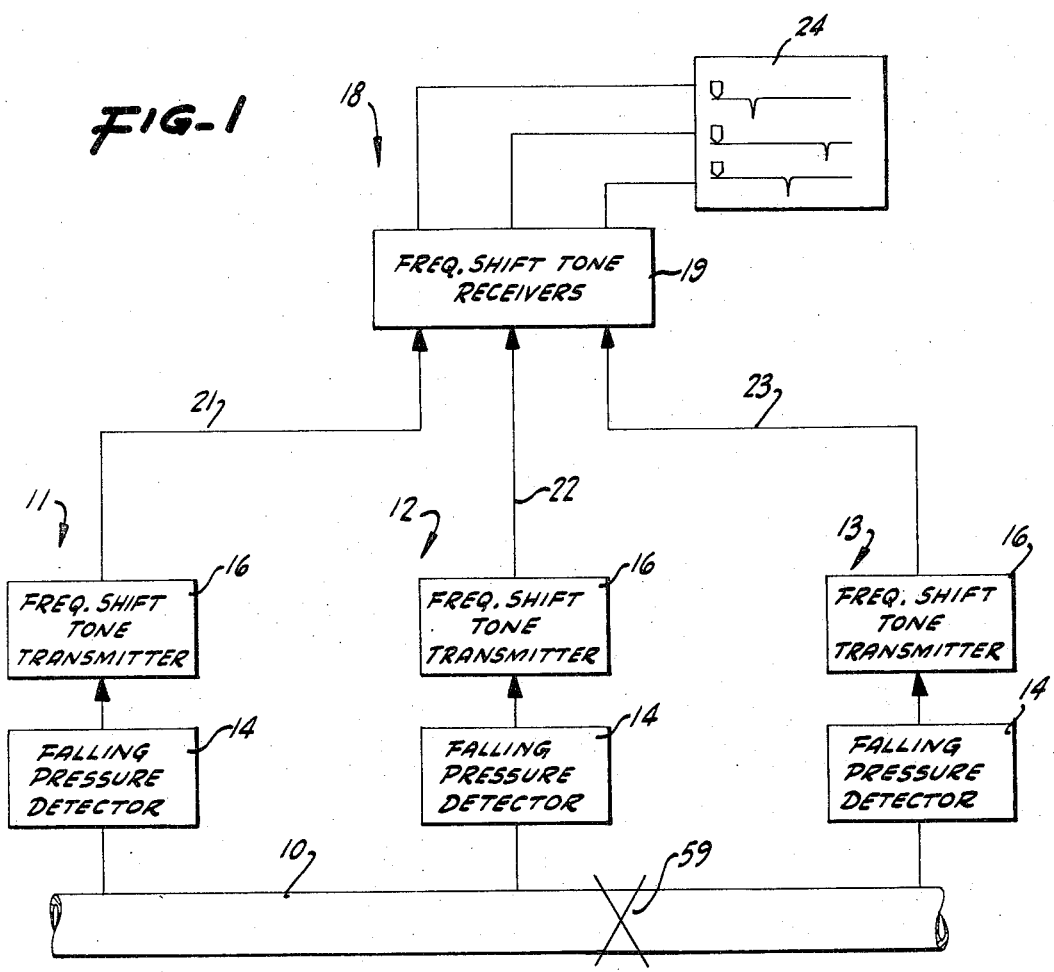
FIG. 1 is a schematic diagram of one embodiment of a leak or break detection system incorporating the present invention.

In FIG. 1 the invention is illustrated in connection with a pipeline 10 which carries a liquid such as crude oil or other petroleum products. In such pipelines, the liquid is commonly moved by means of pumps connected to the line, and the pumps normally maintain the liquid at static pressures which may range from 200 to 1200 psi.

Detecting stations 11–13 are provided at spaced apart locations along the pipeline. Although only a section of the line is shown, it should be understood that similar stations would normally be provided for the remainder of the line. The detecting stations can be spaced as desired, but they should be close enough together so that the negative pressure wave produced by a spontaneous leak or break will reach at least two, and preferably three, stations before being damped out by the liquid. For this reason, the maximum separation of the stations is preferably on the order of 10 to 20 miles. As will appear hereinafter, the calculations required to determine the location of a leak or break are somewhat simplified if the detecting stations are spaced uniformly apart. In a typical embodiment, the stations are spaced 12 miles apart.

Figure 2:
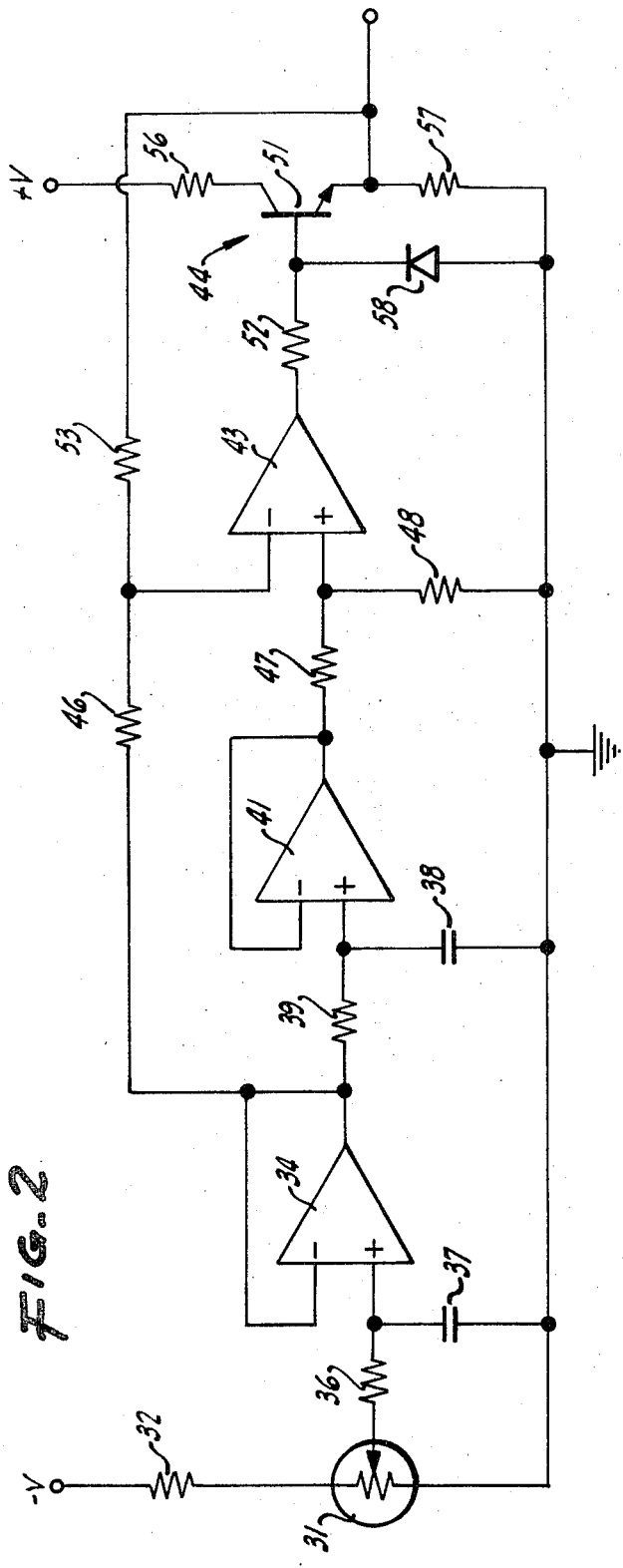
FIG. 2 is a circuit diagram of one embodiment of a falling pressure detector for use in the system illustrated in FIG. 1.
Figure 3:
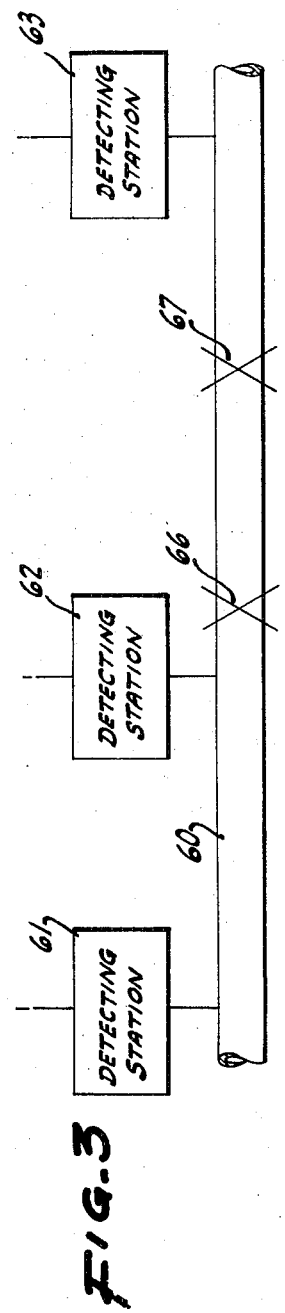
FIG. 3 is a schematic illustration of the invention applied to a pipeline with unequal spacing between the detecting stations.

Detecting stations 11–13 (FIG. 1) each include an electronic falling pressure detector 14 and an electronic frequency shift tone transmitter 16. The falling pressure detector is illustrated in FIGS. 2 and 3 and discussed hereinafter in detail. The frequency shift tone transmitter can be of conventional design. It produces a continuous wave output signal which is shifted in frequency from a center frequency by an amount determined by an input signal applied to the transmitter by the falling pressure detector.

The signals from the transmitters are monitored at a receiving station 18 which can be located remotely of the pipeline as desired. The receiving station includes frequency shift tone receivers 19 which are connected to the transmitters at detecting stations 11 – 13 by lines 21 – 23, respectively. These lines can be any suitable conductors, for example, telephone lines, and they can be any desired length. If each of the transmitters operate on a different frequency band, multiplexing techniques can be utilized to transmit all of the signals over a single line. One low grade telephone line can be employed to handle the signals from about 16 detecting stations on this basis. If multiplexing and different tones are used, a single receiver with means responsive to the different tones can be used at the receiving station.

As illustrated, the outputs of the receivers at the receiving stations are connected to recording means such as a multiple pen recorder 24. This recorder records the different signals on a moving chart record member to provide a visual indication and record of the signals as a function of time. The signals can be applied to other processing and/or recording apparatus as desired, such as a multichannel magnetic tape recorder or other data storage means.

As illustrated in FIG. 2, the falling pressure detector includes a pressure transducer 31 of the variable resistance type. The transducer has a fluid connection with the pipeline, whereby its resistance is proportional to the pressure of the liquid in the line. A suitable transducer having a Bourdon tube connected to the wiper of a variable resistive element is Bourns Model 389, available from Bourne, Ind., Riverside, California. The transducer is connected to a voltage source $-V$ through a resistor 32, and it provides an output voltage which is proportional to the pressure in the line. The signal from the transducer is applied to the noninverting input of an operational amplifier 34 through a high-frequency filter consisting of a resistor 36 and a capacitor 37. The values of the resistor and capacitor are chosen to pass the desired signal and reject noise and other disturbances of short duration. The output of the operational amplifier is connected to the inverting input, and the amplifier has a voltage gain of 1. It will be noted that the signal at the output of operational amplifier 34 is a voltage proportional to the instantaneous pressure of the liquid in the pipeline.

Means is provided for generating a reference signal corresponding to the normal or average pressure of the liquid in the pipeline. This means includes a capacitor 38 which is connected to the output of amplifier 34 through a resistor 39 and is charged by the signal at the output of operational amplifier 34. Resistor 39 is made large relative to capacitor 38 so that the voltage on the capacitor will not follow a sudden change in the instantaneous pressure signal. Capacitor 38 is connected to the non-inverting input of an operational amplifier 41, and the output of this amplifier is connected to the inverting input to provide unity voltage gain. Thus, the signal at the output of operational amplifier 41 is a voltage proportional to the normal or average pressure in the pipeline.

Means is provided for comparing the instantaneous pressure signal at the output of operational amplifier 34 and the reference signal at the output of operational amplifier 41 and providing an output signal corresponding to the difference between the two signals. This means includes a differential amplifier 43 and a buffer amplitude 44. The output of operational amplifier 34 is connected to the negative input of the differential amplifier through a resistor 46, and the output of operational amplifier 41 is connected to the positive input of the differential amplifier through a resistor 47. A resistor 48 is connected between the positive input and the common conductor which is grounded. The buffer amplifier includes an NPN transistor 51, and the output of differential amplifier 43 is connected to the base of transistor 51 through a resistor 52. A resistor 53 is connected between the emitter of the transistor and the negative input of the differential amplifier. The collector of the transistor is connected to a voltage source $+V$ through a resistor 56, and the emitter is connected to ground through a resistor 57. A diode 58 is connected between the base of the transistor and ground for clipping signals corresponding to sudden pressure increases in the pipeline. The signal at the emitter of transistor 51 is a voltage which is proportional to the difference between the instantaneous pressure signal and the reference pressure signal, and in one embodiment this output signal is applied directly to the frequency shift tone transmitter.

Resistors 46, 47, 48 and 53 constitute a weighting network for the differential amplifier, and they provide means for setting the sensitivity of the system. In one embodiment, the ratio of resistor 48 to resistor 47 is 10 to 1, the ratio of resistor 53 to resistor 46 is 10 to 1, and the overall gain of the differential amplifier and the buffer is 10.

Operation and use of the apparatus heretofore described, and therein the method of the invention, can now be described. Initially, it is assumed that detecting stations 11, 12 and 13 are spaced equally along the pipeline, as illustrated in FIG. 1. Pressure transducer 31 at each detecting station produces an electrical signal proportional to the pressure in the pipeline at that station. As long as the pressure remains constant or changes gradually, the voltage across capacitor 38 is equal to the voltage at the output of operational amplifier 34, and the reference signal is equal to the instantaneous pressure signal. In this situation, the output of differential amplifier 43 is zero, transistor 51 is turned off, and the output of the falling pressure detector is zero.

In the event of the rapid increase in the pressure in the pipeline, the instantaneous pressure signal at the output of operational amplifier 34 increases in the negative direction faster than the reference signal at the output of operational amplifier 41, producing a negative voltage at the output of differential amplifier 43. This negative voltage is clipped by diode 58, transistor 51 remains off, and the output of the negative pressure detector remains zero.

In the event of a rapid drop in the pipeline pressure, as would occur in the event of a spontaneous leak or break, the instantaneous pressure signal at the output of operational amplifier 34 decreases in the negative direction faster than the reference signal at the output of operational amplifier 41. Differential amplifier 43 delivers a positive output voltage which is proportional to the difference between the instantaneous signal and the reference signal. Transistor 51 now begins to conduct, producing a positive output voltage which is also proportional to the difference between the instantaneous signal and the reference signal.

In one embodiment, the output voltage from transistor 51 is applied directly to the output of frequency shift tone transmitter 16, and the transmitter delivers a signal which is shifted in frequency from a carrier by an amount which is proportional to the deviation of the pipeline pressure from its normal level. Thus, the signals delivered to receiving station 18 contain information about the amplitude of a pressure drop, and this information is useful in distinguishing leaks and breaks from other disturbances in the pipeline.

Now let it be assumed that a break 59 occurs in the pipeline between detecting stations 12 and 13 at a point closer to station 12. With the stations spaced uniformly along the pipeline, the negative pressure wave produced by the break will reach station 12 first, then station 13, and finally station 11. As the pressure wave is detected at each station, the transmitter at that station delivers a signal to receiving station 18, where the signals are recorded on a moving chart by recorder 24. The signals are displaced in time by an amount corresponding to the location of the break relative to the detecting stations. The first two signals to arrive at the receiving station are the signals from detecting stations 12 and 13, indicating that the break has occurred between these stations. The location of the break is defined by the relationship $d = D - ct/2$, where the d is the distance between the break and detecting station 12, D is the distance between detecting stations 12 and 13, t is the time interval the arrival of the signals from stations 12 and 13, and c is the velocity of sound in the liquid in the pipeline.

With unequal spacing between the detecting stations, a second calculation may be required to determine the location of a spontaneous leak or break. FIG. 3 illustrates a pipeline 60 provided with detecting stations 61–63 which are similar to detecting stations 11–13. However, stations 61 and 62 are closer together than stations 62 and 63. Let it be assumed that a break occurs between stations 62 and 63 at a point 66 which is closer to station 61 than to station 63. The negative pressure wave from this break arrives first at station 62, then station 61, and finally station 63. Since the first two signals to arrive at the receiving station come from detecting stations 62 and 61, it might appear that the break is located between these two stations. However, applying the formula for determining the location of the break to the signals from stations 61 and 62 gives an ambiguous result of zero. This result means that the break is either located at station 62 or between stations 62 and 63. The location can, however, be determined by applying the formula to the signal from either station 61 or 62 and the signal from station 63.

If a break occurs at a point 67 which is closer to station 63 than to station 61, the first two signals will arrive at the receiving station from stations 62 and 63. These signals will correctly indicate that the break has occurred between stations 62 and 63, and the location of the break can be determined by a single calculation based on the signals from these two stations.

Figure 4:
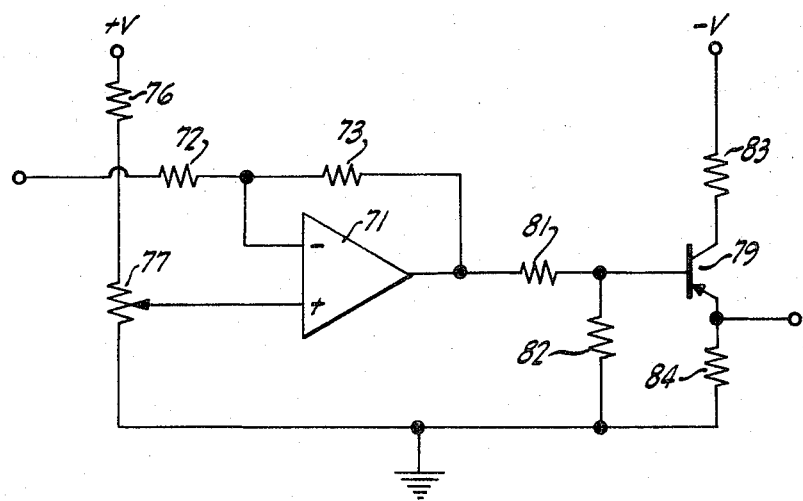
FIG. 4 is a circuit diagram of one embodiment of a level detector for use in conjunction with the falling pressure detector of FIG. 2 in the system of FIG. 1.

FIG. 4 illustrates a level detector which can be utilized with falling pressure detector 14 to provide discrimination against small negative pressure drops in the pipeline. The level detector comprises a Schmitt trigger which includes an operational amplifier 71. The output of the falling pressure detector is connected to the inverting input of operational amplifier 71 through a resistor 72. A resistor 73 is connected between the output and the inverting input of the operational amplifier. A reference voltage is applied to the non-inverting input of the operational amplifier from a source +V by means of a voltage divider consisting of resistors 76 and 77. Resistor 77 is variable, and provides means for setting the level of input signal required to fire the Schmitt trigger. The output of the operational amplifier is connected to the base of a PNP transistor 79 by a resistor 81. A biasing resistor 82 is connected between the base of the transistor and ground, and the collector is connected to a voltage source −V through a current limiting resistor 83. A resistor 84 is connected between the emitter and ground, and the output of the level detector is taken at the emitter. This point is connected to the input of frequency shift tone transmitter 60.

Operation and use of the embodiment utilizing the level detector can be described briefly. The falling pressure detector functions as before, and its output signal is applied to the inverting input of operational amplifier 71. As long as this signal remains below the level set by variable resistor 77, the output of operational amplifier 71 is positive, and transistor 79 is turned off. With the transistor turned off, its emitter is at ground potential, and the output of the level detector is zero. When the output of the falling pressure detector exceeds the level set by resistor 77, the Schmitt trigger fires, and the voltage at the output of operational amplifier 71 becomes negative. This negative voltage causes transistor 79 to saturate, producing a constant output voltage at the emitter. This constant output actuates the frequency shift tone transmitter, which delivers a signal to the receiving station, as before. Now, however, the amount of frequency shift is determined by the signal from the level detector, and it remains constant, rather than varying with the magnitude of the pressure drop. This fixed frequency shift is particularly desirable if the signals from more than one transmitter are to be transmitted over a single line. In this case the level detector and transmitter at each detecting station can be arranged to provide a different frequency shift or tone, and the station from which the signal is transmitted can be identified from the tone at the receiving station.

When the level detector is utilized, the location of a leak or break can be determined at the receiving station in the same manner as before. Now, however, the system provides additional discrimination against noise and other disturbances of small magnitude.

The invention has a number of important features and advantages. For example, it is more sensitive and reliable then prior art systems which utilize a differential pressure meter. It has a greater range than the differential meter systems, and being electronic, it is smaller in size and requires less maintenance.

It is apparent from the foregoing that a new and improved system and method for detecting and locating a leak or break in a liquid pipeline has been provided. While only the presently preferred embodiments have been described, as will be apparent to those familiar

I claim:

1. In a method of detecting and locating a spontaneous leak or break between two detecting stations in a pipeline carrying liquid under pressure, the leak or break being characterized by a rapid decrease in pressure which is propagated away from the leak or break by the liquid in the line at a velocity corresponding to the velocity of sound in the liquid, the steps of generating an electrical signal at each of the detecting stations corresponding to the pressure of the liquid in the pipeline at that station, providing a reference signal at each detecting station corresponding to the normal pressure of the liquid in the pipeline at that station, comparing the electrical signal and the reference signal at each detecting station, detecting a spontaneous leak or break in the line by a change in the electrical signal relative to the reference signal at each detecting station as the decrease in pressure associated with the leak or break reaches that station, and shifting the frequency of a carrier to transmit signals from the detecting stations to a receiving station when the leak or break is detected at the respective detecting stations, the signals received at the receiving station being displaced in time by an amount corresponding to the location of the leak or break relative to the detecting stations.

2. A method as in claim 1 wherein the reference signal is derived from the electrical signal at each detecting station.

3. A method as in claim 1 wherein the transmitted signals vary in frequency in accordance with the difference between the reference signals and the electrical signals at the respective detecting stations.

4. A method as in claim 1 further including the steps of providing an output signal at each detecting station having a magnitude corresponding to the difference between the reference signal and the electrical signal, monitoring the level of the output signal at each detecting station, and transmitting the frequency shifted signal from the station if the output signal at the station reaches a predetermined level.

5. A method as in claim 1 wherein the signal transmitted from each detecting station is shifted in frequency by a predetermined amount, said predetermined amount being different for each detecting station.

6. A method as in claim 1 further including the step of recording the signals at the receiving station.

7. In a system for detecting and locating a spontaneous leak or break between two detecting stations in a pipeline carrying liquid under pressure, the leak or break being characterized by a rapid drop in pressure which is propagated away from the leak or break by the liquid in the line at a velocity corresponding to the velocity of sound in the liquid, transducer means at each detecting station for providing an electrical signal corresponding to the pressure of the liquid in the line at that station, means at each detecting station for providing a reference signal corresponding to the normal pressure of the liquid in the line at that station, means at each detecting station for comparing the electrical and reference signals and producing an output signal corresponding to the difference between said signals, and means including a frequency tone shift transmitter at each detecting station and at least one frequency tone shift receiver at the receiving station for transmitting signals from the detecting stations to a receiving station in response to the output signals, the transmitted signals being displaced in time by an amount corresponding to the location of the leak or break relative to the detecting stations.

8. A system as in claim 7 wherein the transmitted signals vary in frequency in accordance with the output signals.

9. A system as in claim 7 further including level detector means for monitoring the output signal at each detecting station and causing the frequency shifted signal to be transmitted when the output signal reaches a predetermined level.

10. A system as in claim 7 further including means at the receiving station for recording the signals from the detecting stations.

11. A system as in claim 7 wherein the means for providing a reference signal includes a capacitor which is charged in accordance with the electrical signal.

12. In a method of detecting and locating a spontaneous leak or break between two detecting stations in a pipeline carrying liquid under pressure, the leak or break being characterized by a rapid decrease in pressure which is propagated away from the leak or break by the liquid in the line at a velocity corresponding to the velocity of sound in the liquid, the steps of generating an electrical signal at each of the detecting stations corresponding to the pressure of the liquid in the pipeline at that station, providing a reference signal at each detecting station corresponding to the normal pressure of the liquid in the pipeline at that station, comparing the electrical signal and the reference signal at each detecting station, detecting a spontaneous leak or break in the line by a change in the electrical signal relative to the reference signal at each detecting station as the decrease in pressure associated with the leak or break reaches that station, providing an output signal at each detecting station having a magnitude corresponding to the difference between the reference signal and the electrical signal, monitoring the level of the output signal and each detecting station, and transmitting a signal from the detecting station to the receiving station if the output signal reaches a predetermined level, the signal received at the receiving station being displaced in time by an amount corresponding to the location of the leak or break relative to the detecting station.

13. In a system for detecting and locating a spontaneous leak or break between two detecting stations in a pipeline carrying liquid under pressure, the leak or break being characterized by a rapid drop in pressure which is propagated away from the leak or break by the liquid in the line at a velocity corresponding to the velocity of sound in the liquid, transducer means at each detecting station for providing an electrical signal corresponding to the pressure of the liquid in the line at that station, means at each detecting station for providing a reference signal corresponding to the normal pressure of the liquid in the line at that station, means at each detecting station for comparing the electrical and reference signals and producing an output signal corresponding to the difference between said signals, level detector means for monitoring the output signal at each detecting station, and means for transmitting signals from the detecting station to a receiving station in the event that the output signals reach a predetermined level, the transmitted signals being displaced in time by an amount corresponding to the location of the leak or break relative to the detecting stations.

* * * * *